INVENTOR.
LAWRENCE E. IVINS
ATTORNEYS.

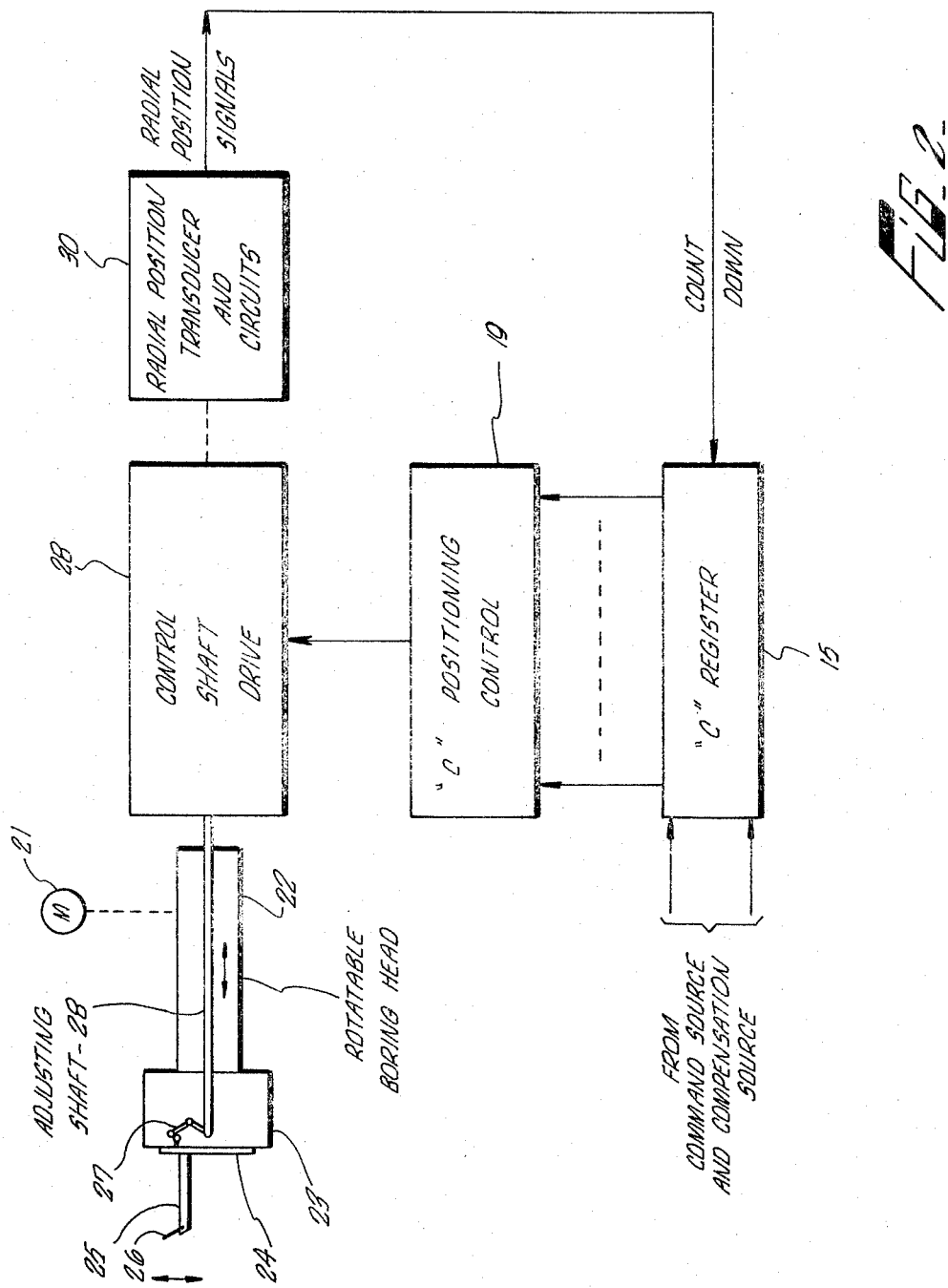

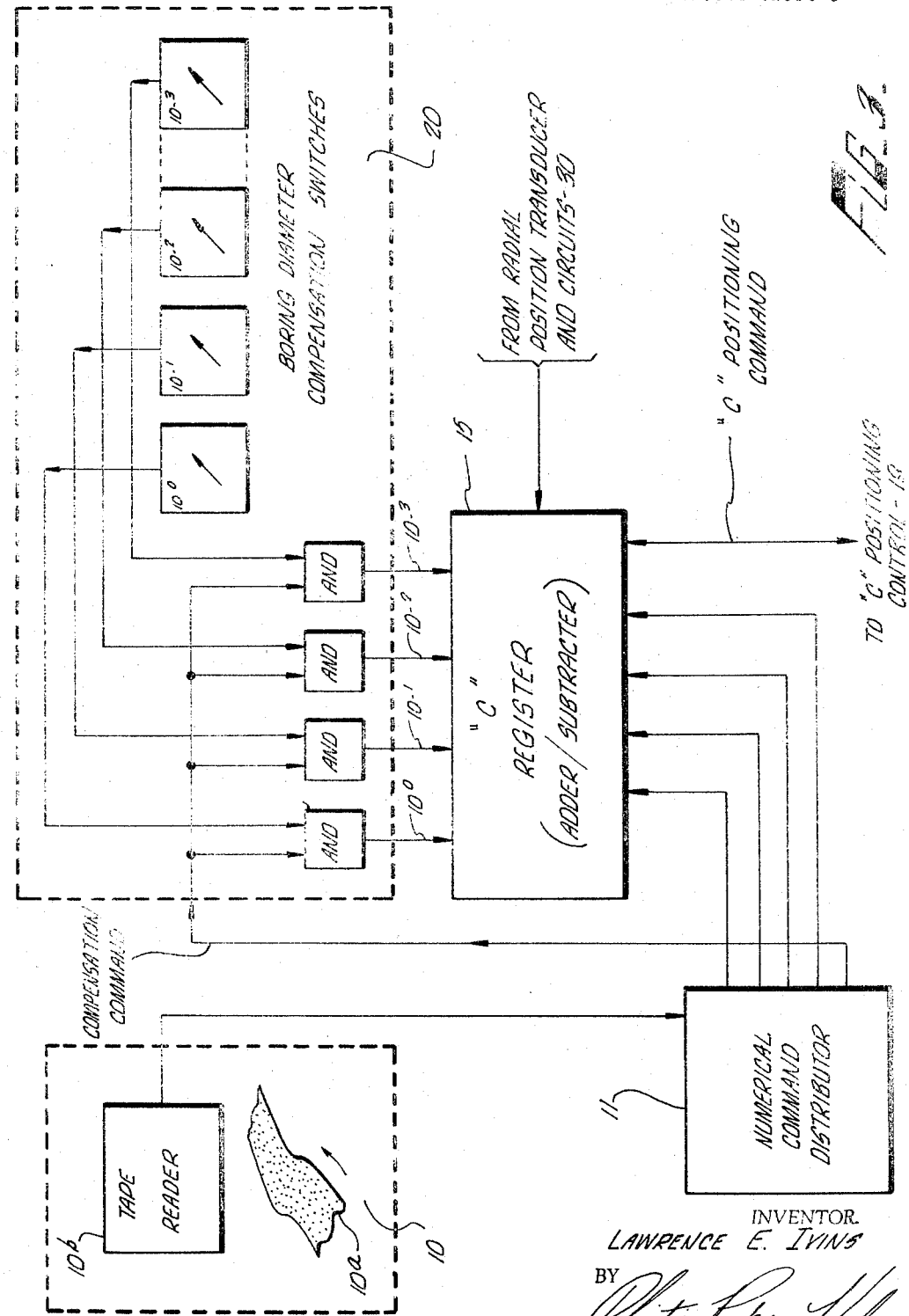

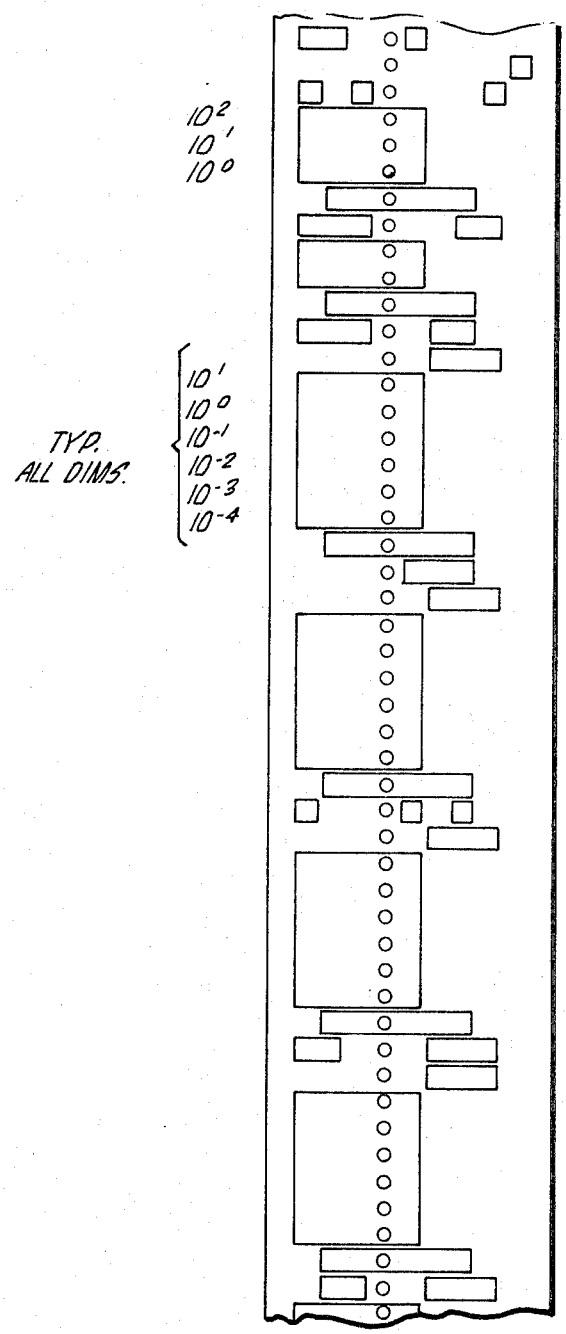

United States Patent Office 3,279,285
Patented Oct. 18, 1966

3,279,285
BORING MACHINE
Lawrence E. Ivins, Palos Verdes, Calif., assignor, by mesne assignments, to Ex-Cell-O Corporation, Detroit, Mich., a corporation of Michigan
Continuation of abandoned application Ser. No. 69,203, Nov. 14, 1960. This application Apr. 16, 1965, Ser. No. 448,782
9 Claims. (Cl. 77—1)

This application is an improvement over the earlier filed application bearing Serial No. 315,116, filed on October 3, 1963, entitled "Machine Tool" and which application is a continuation of the earlier filed application bearing Serial No. 69,203, filed on November 14, 1960, now abandoned, and all assigned to the same assignee as the present invention.

This invention relates to a boring machine and, more particularly, to an improved numerically controlled boring machine having provisions for adjusting the tool or radius axis.

Digital techniques for controlling machine tools have been developed whereby the machine can be commanded for the positioning of a workpiece relative to the cutting tool along the three conventional axes, longitudinal, horizontal and vertical. Such digital control systems are presently in commercial use. The development of these digital techniques for controlling a machine tool includes the digital implementation of the compensation for tool wear and tool setting along with the control of the three conventional axes. It is well known that when the machine tool is a boring machine that the tool is difficult to set up with precision since this is a manual operation. Irrespective of the accuracy of the original setting, it is also known that the setting changes as the tool wears, whereby the bore diameter may vary from the desired diameter and be different in every workpiece unless continuously re-adjusted. Digital techniques or numerical controls have been applied to a boring machine, including the digital control of the tool or radius axis of the boring tool. One such four axis digital control arrangement applicable to a boring machine is disclosed and claimed in the aforementioned copending patent application bearing Serial No. 315,116. This four axis digital control arrangement differs from the prior art boring machines having the fourth axis of movement since they are basically analog controls wherein movement along the fourth axis is very limited. These prior art boring machines, in addition, have been designed and are operable for a single diameter bore wherein the fourth axis or bore diameter is adjustable over a very narrow range, as distinguished from the ranges of diameters capable of the boring machine of the aforementioned copending patent application. Despite the advances in the numerical control of machine tools and, in particular, the boring machine, there are no known numerical control systems that include a bore diameter compensation that may be numerically commanded and/or integrated into the numerical control system. The bore diameter compensation would include compensation for tool setup as well as compensation for the change in the setting as the tool wears. Accordingly, there is a present need for a four axis numerical control system for a boring machine that includes means for compensating for bore diameter, including both undersized and oversized bores.

The present invention provides an improved four axis numerical control circuit for a boring machine wherein the command position for the fourth axis may be modified to compensate for the bore diameter variations from a desired diameter. This bore diameter compensation may be combined with the commanded fourth axis position to generate a new fourth axis command that may be employed for subsequent runs of workpieces requiring the same bore diameter and continuously monitored and further modified, when necessary, to compensate for tool wear during subsequent runs. The improved numerical control system is not only economically incorporated into present systems, but also reduces tool setup time and setting changes as the tool wears. The bore diameter compensation is effected by the machine operator manually entering into compensation switches a number equal to the difference between the actual bore diameter and the desired bore diameter, irrespective of whether the bore is under or over size. This compensation or correction signal is added to the commanded bore diameter command for the fourth axis in response to a special numerical command whereby the machine is setup and the workpiece bored in response to the compensated fourth axis command.

Structurally, the present invention comprises a boring machine having a rotatable boring shaft mounting a radially adjustable boring bar having a boring tool extending therefrom. The boring shaft is arranged with boring bar positioning control apparatus for permitting the boring bar to be continuously positioned while the boring shaft is rotating and including while the boring bar is positioned in a bore of a workpiece. A four axis digital positioning control circuit is connected to the machine including the positioning control apparatus for controlling the relative postion of the boring shaft and the boring bar and a workpiece. The digital positioning control includes a source of numerical commands for commanding a position along the three axis including a numerical command for positioning along the fourth or boring axis. The source of numerical commands may comprise a conventional perforated paper tape that is employed with another numerical command source which may be in the form of a manually operated thumb wheel switch for entering a bore diameter compensation or correction signal into the control circuit proper. The control circuit includes means coupled to the aforementioned source for arithmetically combining, by addition or subtraction, these two numerical commands for the fourth axis for correcting the commanded bore diameter from the tape to obtain a bore having the desired diameter.

These and other features of the present invention may be more fully appreciated when considered in the light of the following specifications and drawings in which:

FIG. 2 is a diagrammatic illustration of a boring shaft having an adjustable boring head including a block diagram of the control therefore;

FIG. 3 is a block diagram of the control of the boring radius in accordance with FIG. 1; and FIG. 4 is a partial representation of a control member for use in the control of FIGS. 1 and 3.

Figure 1:
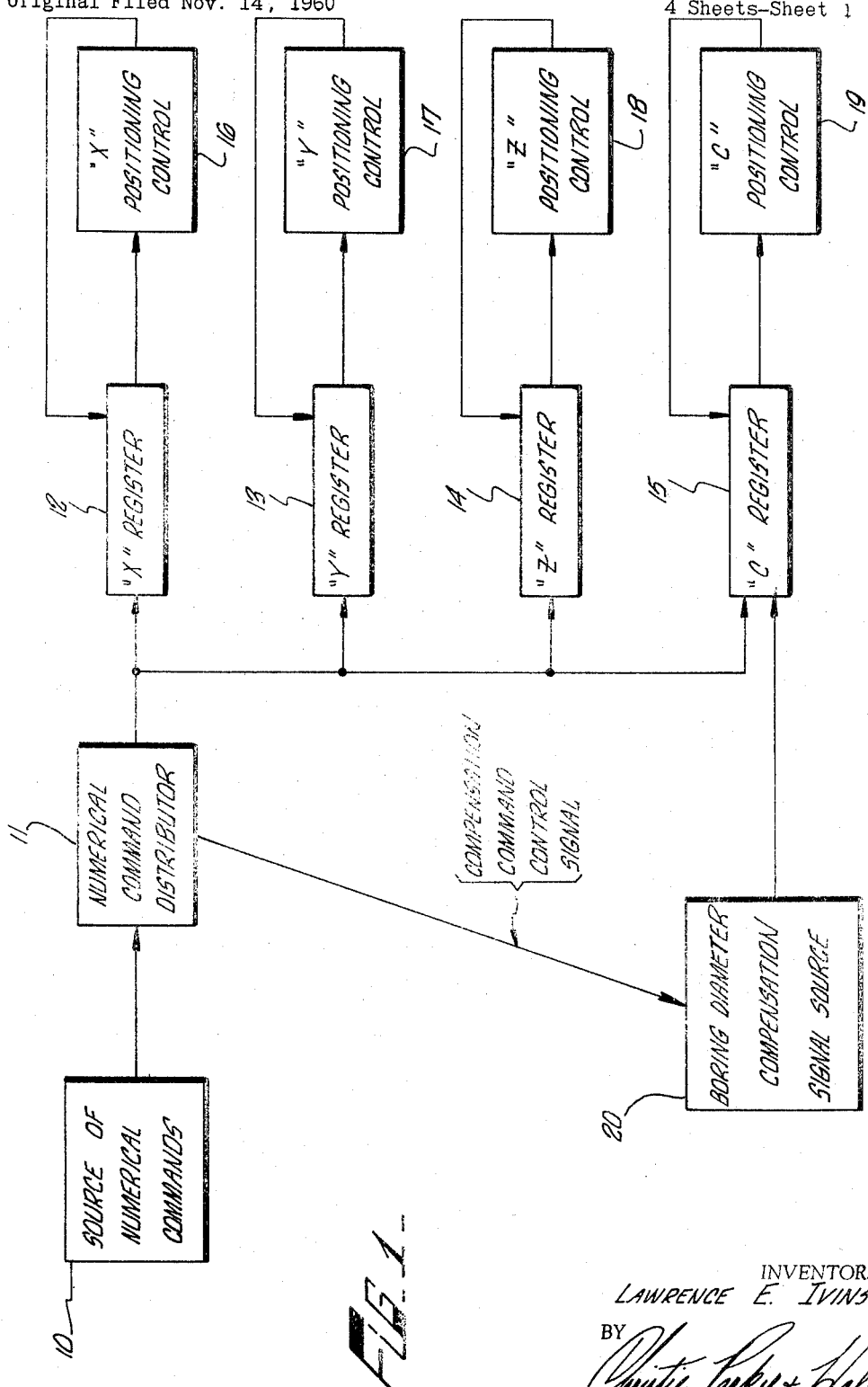
FIG. 1 is a block diagram of a numerical control system embodying the invention.

The present invention is directly applicable to a boring machine that is adapted for four axes of control. The control being preferably a numerical control arrangement although analog controls may be employed within the concept of the present invention. A boring machine that is so adapted is disclosed in the copending application bearing Serial No. 315,116, mentioned hereinabove and which disclosure is incorporated herein by reference. Only those portions of the boring machine necessary to a complete understanding of the present invention are, therefore, described and illustrated herein.

The specific feature of a boring machine and the control therefor that is disclosed in the aforementioned copending application and that is important for the purposes of this invention is that the boring head may be controlled and thereby the radius of the bore to allow bores of varying diameters to be programmed. The boring head can be controlled in this fashion even during the intervals that the boring shaft is rotating and in response to numerical commands defining a desired boring radius. The commanding and controlling of the boring machine is adapted to control the relative positions of a workpiece and the boring shaft or spindle about orthogonally related axes or the conventional X or longitudinal axis, the Y or cross axis, and the vertical or Z axis with the fourth axis, the radius or tool axis, being identified as the C axis.

With this in mind and referring to FIG. 1 in particular, the invention can be examined in more detail. FIG. 1 illustrates in block diagram form a numerical control system for controlling a boring machine including the commanding of the position of the boring tool and the arrangement for compensating for the boring diameter. The compensation includes the correction for the setting of the boring tool as well as the wear of the boring tool and any other factors that may effect the resulting bore relative to a desired diameter of bore.

The boring machine is commanded from a source of numerical commands 10 that are coupled to a numerical command distributor 11 for distributing the commands necessary for effecting a desired boring operation to the controlled elements including the registers for commanding the corresponding machine elements. For this purpose the control along the three conventional axes results from the storing of the numerical commands in a register individual to an axis. To this end, the positioning along the X axis is controlled by the command entered into the X register 12 with the control along the Y and Z axes being commanded from the numerical signal stored in the registers 13 and 14, respectively. In the same fashion, the boring radius is commanded from the numerical signal stored in the C register 15. As is conventional, each of the registers 12–15 are coupled with positioning control correspondingly identified as the X, Y, Z, and C positioning controls bearing the reference numerals 16, 17, 18 and 19, respectively. Each of these positioning control provides a feedback signal that counts down or subtracts from the commanded position in their corresponding registers until the registers indicate a zero count indicating the desired position has been reached. This control action is more fully described in the aforementioned copending application bearing Serial No. 315,116 and resort thereto may be had if necessary.

The source of numerical commands includes a command for controlling the entry of the compensation or correction signal into the C register 15 to correct the boring radius signal commanded from the source 10 when it has been determined by the machine operator, through gauging and the like, that the bored diameter differs from the desired diameter either by being undersized or oversized. Accordingly, the source of numerical command signals includes a compensation command control signal that is coupled by means of the numerical command distributor 11 to a boring diameter compensation signal source 20. The boring diameter compensation signal source provides a signal representative of the difference between the desired boring diameter and the actual gauged diameter of the workpiece. This difference or correction signal is entered into the C register 15 in response to the compensation command control signal. Subsequently, this compensation signal is arithmetically combined with the numercal command corresponding to the C axis derived from the source 10 whereby the C positioning control 19 will position the boring tool in accordance therewith to provide a bore of the correct radius or a bore that has been compensated for tool wear and/or tool setting.

A more comprehensive understanding of the distribution of the numerical commands may be had by reference to my copending application bearing Serial No. 62,986, filed on October 17, 1960, entitled Electronic Switch, and assigned to the same assignee as the present application, incorporated herein by reference.

Now referring to FIG. 2, the specific interrelationship of the elements of the boring shaft to effect the desired control and compensation along the fourth axis will be described. The boring or power shaft 22 is diagrammatically illustrated in FIG. 2 and it will be understood that it is mounted on the boring machine proper (not shown) whereby it may be continuously rotated. For this purpose, the boring shaft 22 will be coupled to a drive motor 21 that is effective for continuously rotating the boring shaft 22 when energized.

The boring shaft 22 mounts a boring head 23 at the tool-bearing end thereof, as is conventional. In this instance the boring head 23 includes a boring slide 24 mounting a boring bar 25 and which boring bar in turn carries the boring tool 26. The boring slide 24 is radially movable relative to the center line of the boring shaft 22 and thereby controls the radial position of the boring bar 25 and the boring tool 26 carried thereby. To this end, the boring slide 24 is controlled by means of a bell crank 27 connected thereto and to an adjustable control shaft 28 coaxially mounted with the boring shaft 22. The control shaft 28 is adapted to be longitudinally movable relative to the boring shaft 22 and thereby operates the bell crank 27. This structural arrangement for controlling the radial position of the boring head 25 is generally the same as that disclosed in the aforementioned copending patent application bearing Serial No. 315,116 except that the positioning control arrangement for adjusting the position of the control shaft 28 is now located outside of the boring spindle proper. It should be recognized that the same general type of elements disclosed in that copending patent application may be utilized for the purposes of this invention and are comprehended by the control shaft drive illustrated in block form and identified by the reference numeral 28.

Specifically, although not illustrated, the control shaft drive may include a lead screw coacting with a preloaded ball nut and bevel gears coupled to a hydraulic motor drive for controlling the longitudinal position of the adjusting shaft 28. In addition, a position transducer 30 and the circuits therefor are coupled to the adjusting shaft drive 28 to provide the radial position signals to the numerical control circuits proper. As described in the control of Serial No. 315,116, the radial position signals derived from the transducer and circuits therefor are coupled back as feedback signals to count down the C register 15. In addition, the C register 15 is adapted to command and actuate the C positioning control 19 arranged to receive the digital signals from the C register 15 and operate the control shaft drive 28 in response thereto. At this point, it should be noted that the C positioning control 19, as illustrated in FIG. 1, comprehends the radial position transducer and circuits 30 and that it has been identified as separate element in FIG. 2 for purposes of explanation. The C register 15, in accordance with the present invention, may include the combination of the signals from the source of numerical commands 10 in addition to the signals, if any, entered from the boring diameter compensation signal source 20.

A more detailed appreciation of the coaction of the numerical commands for positioning and compensating the commanded position along the C axis may be had by reference to FIG. 3. In FIG. 3, the source of numerical commands 10 is diagrammatically illustrated as comprising a control member in the form of a perforated paper tape 10a and a tape reader 10b for reading the perforations and providing electric signals corresponding thereto. In the same fashion, the boring diameter compensation signal source 20 is illustrated as comprising a bank of thumb wheel switches that may be manually operated to enter the correction or compensation signal into the C register 15. For this purpose, the boring diameter compensation switches may be the commercially-available thumb wheel switches manufactured by the Digitran Company of Pasadena, California, and identified as the "Digitswitch." The switches are rotatable to provide an electrical signal corresponding to a decimal number and when employed with an electronic counter of the flip-flop type are adapted to cause the counter to assume binary states corresponding to the decimal number entered into the switches. This recording of a compensation radius can be considered a "force" entry into the electronic counter or C register 15. Each thumb wheel switch is constructed, and is commercially available, with an AND gating circuit. The "force" entry of the compensation or correction signal into the C register 15 is controlled by a compensation command control signal derived from the tape reader 10b and applied to each of the AND circuits.

An important feature that the C register 15 must have to provide the correct arithmetic combination of the compensation and C command signals is the provision for carrying between flip-flop stages when an electronic register is employed. In addition, the register should be bi-directional, be capable of accepting a correction signal that both adds and subtracts from the commanded C position. The registers disclosed in the aforementioned co-pending patent applications have this desirable property.

In one practical embodiment of the source of numerical commands wherein the numerical commands are recorded on a paper tape, the compensation control command is recorded as the first word on the tape 10a and specifically identified as the "g" word. For this purpose, an illustrative paper tape 10a is shown in FIG. 4. It will be seen from examining FIG. 4 that the format of the tape includes the conventional "tab" for entering the information into the correct register followed by the "g" word and then followed by the preparatory function. The "g" word and the remaining words recorded on the control tape 10a is in the form of binary coded decimal information. The numerical commands are recorded in sequential order and the tabs differentiate the numerical commands for controlling the machine along the X, Y, and Z axes. The last piece of recorded information is the command for the control along the C axis and is arranged between tabs 5 and 6, as illustrated.

With the above structure in mind, the operation of the boring machine may be readily appreciated. Once the control tape 10a is generated in accordance with the format illustrated in FIG. 4, it is placed into the tape reader 10b. The boring machine is then ready to be commanded from this source of signals. It will be assumed that the workpiece is clamped to the machine and is the first workpiece to be bored from the control tape 10a. Accordingly, the boring diameter compensation signal source 20 will not provide an output signal. Specifically, each of the boring diameter compensation switches will be set at the decimal zero position. The motor 21 is energized to place the boring shaft 22 in operation. The numerical control system is then placed in operation and will go through a read phase and a machine phase to automatically bore the workpiece to the commanded diameters. In the read phase, the signals provided by the tape reader 10b are applied to the numerical command distributor 11 and distributed to the correct registers as they are sequentially derived from the tape 10a, row by row, the "tab" markings controlling the distribution to the correct registers. Once all of the information is entered into the desired registers, including the X, Y, Z, and C registers 12 through 15, respectively, the machine elements are now in condition to be positioned to the positions commanded by their respective registers and the machine enters the machine phase of operation. Since the compensation switches are set to zero, the C register 15 merely stores the "C" command derived from the control tape 10a.

It will be appreciated that a practical numerical control system is much more involved than the arrangements illustrated and described since the circuitry for controlling the conventional X, Y, and Z axes and all the auxiliary machine functions are necessary. As mentioned hereinabove, the circuitry necessary for modifying the control along the "C" axis is only disclosed. Accordingly, it is assumed, as is well known in the art, that the various machine elements are controlled or positioned by their corresponding positioners, such as the X, Y, and Z controls 16 through 19, in response to the commands previously entered into their corresponding registers. With the positioning of the machine elements along the X, Y, and Z axes, the workpiece will be bored to the desired diameter by means of the C positioning control 19 in response to the command stored in the "C" register 15 to complete the machining operation.

With the completion of the machining operation, the operator may then gauge the bore to determine if the desired bore has been achieved. If the gauged bore is not within the prescribed tolerances, the operator then, assuming that the bore is undersized, enters a correction signal into the boring diameter compensation switches corresponding to the difference between the gauged diameter of the bore and the desired bore. The numerical control system will again be energized to rebore the workpiece. During this second run, the "g" word or command will be distributed to the AND circuits for each of the thumb wheel switches to "force" enter the compensation signal in the "C" register 15. Accordingly, when the C command is derived from the tape 10a and distributed to the C register 15, the register will store the correct sum of these two commands to provide the desired compensated command. Accordingly, during the machine phase of the second run, the workpiece will be bored in response to the compensated command and should provide a bore of the correct diameter. If not, a further correction may be entered into the compensation switches and the bore re-run to correct the diameter. With the completion of all of the bores on a single workpiece, another workpiece may be automatically bored from the same control tape in combination with the correction information from the compensation switches as long as the same tool setting maintains. This may be repeated a number of times with the machine operator gauging the bore diameter after such run to determine if the bore is within the prescribed tolerances and, if not, to continuously change the setting of the boring diameter compensation switches to cause the machine to automatically compensate for the tool wear and the like.

In the same fashion, it should be appreciated that if the original gauged bore is oversized, then the boring diameter compensation switches are provided to introduce a signal into the C register 15 to subtract from the command position so that the next workpiece may be bored within the desired tolerances.

What is claimed is:

1. A boring machine comprising a rotatable boring shaft including a boring head mounting a boring bar adapted to be adjusted for different boring radii, the boring head having a boring slide for radially positioning the boring bar relative to said boring shaft and means including an adjusting shaft coaxially disposed of said power shaft for controlling the position of the boring slide and thereby the boring radius, automatic means for commanding and controlling the boring of a workpiece along three axes including commanding and controlling the position of the adjusting shaft, and means coupled to said automatic means for modifying the commanded position of the adjusting shaft.

2. A machine tool comprising a rotatable power shaft, a radially adjustable tool head connected to said power shaft to be rotated thereby, a tool adjusting shaft coaxially disposed of said power shaft and having a connection with said tool head to radially displace said tool head upon rotation of said tool adjusting shaft relative to said power shaft, automatic control means for commanding and relatively positioning a workpiece and the tool head in response to the commands including the positioning of the tool adjusting shaft, and means connected to said automatic control means for modifying the commanded position of the tool adjusting shaft and thereby the tool head.

3. In a boring machine having a rotatable boring shaft carrying a boring tool, means for automatically commanding and controlling the radial position of the boring tool to provide bores of varying diameters including when the boring shaft is rotating, means for automatically controlling the positioning of the boring shaft relative to a workpiece along three axes, and means coupled to said means for controlling the radial position of the boring tool for modifying the commanded position of the boring tool.

4. In a numerically controlled boring machine having a source of numerical commands providing four axis control of the boring machine, means connected to be responsive to said source for automatically boring a workpiece, means coupled to said automatic means for generating a bore diameter numerical compensation signal, said automatic means being further characterized as including means for combining the compensation signal and the fourth axis numerical command to provide a compensated fourth axis numerical command to cause a workpiece to be automatically bored in response to the compensated fourth axis numerical command.

5. In a numerically controlled boring machine having a rotatable boring shaft mounting a radially adjustable boring bar having a boring tool, boring bar positioning control apparatus for permitting the boring bar to be continuously positioned while the boring shaft is rotating, a four axis digital positioning control circuit connected to the positioning control apparatus for controlling the relative position of the boring bar and a workpiece in accordance with the conventional three axes and controlling the relative position of the boring bar and the workpiece in accordance with the fourth or boring axis, said digital positioning control including a source of numerical commands including a numerical command for positioning along the fourth axis, and another numerical command source and modifying the numerical command for the fourth axis provided by the first mentioned source, and means coupled to be controlled from the first mentioned source for arithmetically combining the numerical commands for the fourth axis for correcting the bore diameter.

6. A boring machine comprising a rotatable boring shaft carrying a boring head mounting a boring bar adapted to be adjusted for different boring radii, the boring head having a boring slide for radially positioning the boring bar relative to said boring shaft and a bell crank connected to operate the boring slide, a control shaft coaxially mounted within the boring shaft having one end connected to the bell crank and adapted for movement longitudinally of the boring shaft, drive means coupled to the other end of the control shaft for adjusting the position thereof and thereby the boring bar, a source of numerical commands providing four axis commands for the boring machine wherein the fourth axis command is the command for operating said drive means, numerical control means connected to be responsive to said source for automatically boring a workpiece including permitting the control shaft to be adjusted while the boring shaft is rotating, and means coupled to said numerical control means for generating a bore diameter compensation signal, said numerical control means including means for correctly combining the compensation signal and the fourth axis numerical command to provide a bore diameter compensation command to cause a workpiece to be automatically bored in response to the compensated fourth axis numerical command.

7. A boring machine as defined in claim 6 wherein said compensation means are a plurality of manually operated switches.

8. A boring machine as defined in claim 6 wherein said source of numerical commands comprising a control member having information marks including a compensation command control mark recorded thereon and means for reading the marks and providing electrical signals corresponding thereto.

9. In a four axis numerically controlled boring machine including a source of numerical command signals for providing numerical control of the machine along four axes including a correction combining control signal, a source of digital signals settable for correcting the bore diameter, numerical control circuit means including arithmetic means connected to be responsive to the source of numerical command signals for controlling and automatically boring a workpiece including positioning along the fourth axis in accordance with the combination of the fourth axis command and the correction signals, said arithmetic means being connected to said source of numerical signals and responsive to the correction combining signal for entering the correction signal therein to cause a workpiece to be bored at a diameter corresponding to the combination of the fourth axis command and the correction signals.

References Cited by the Examiner
UNITED STATES PATENTS

| | | |
|---|---|---|
| 2,383,050 | 8/1945 | Esson. |
| 2,945,401 | 7/1960 | Howey et al. _____ 77—3 |
| 3,016,778 | 1/1962 | Fitzner _____ 82—14 |
| 3,125,796 | 3/1964 | Brainard _____ 77—4 X |

WILLIAM W. DYER, JR., *Primary Examiner.*

G. A. DOST, *Assistant Examiner.*